United States Patent [19]

Borchering et al.

[11] Patent Number: 4,782,508

[45] Date of Patent: Nov. 1, 1988

[54] METHOD OF DISCOURAGING THE COMPLETION OF WRONG-NUMBER CALLS

[75] Inventors: James W. Borchering, West Chicago; Louis M. Taff, Warrenville, both of Ill.

[73] Assignee: American Telephone and Telegraph Company, AT&T Bell Laboratories, Murray Hill, N.J.

[21] Appl. No.: 839,865

[22] Filed: Mar. 3, 1986

[51] Int. Cl.⁴ .............................................. H04M 3/42
[52] U.S. Cl. ..................................... 379/67; 379/197; 379/213
[58] Field of Search ...................... 379/67, 84, 88, 156, 379/165, 196–199, 201, 213, 214, 387, 352

[56] References Cited

U.S. PATENT DOCUMENTS

| | | | |
|---|---|---|---|
| 3,111,561 | 12/1963 | Dunning | 379/82 |
| 3,436,486 | 4/1969 | Stevens | 379/196 |
| 3,573,387 | 4/1971 | Nebe | 379/196 |
| 3,673,339 | 6/1972 | Korn | 379/190 |
| 4,277,649 | 7/1981 | Sheinbein | 379/201 |
| 4,278,844 | 7/1981 | Jones | 379/172 X |
| 4,376,875 | 3/1983 | Beirne | 379/88 |
| 4,393,278 | 7/1983 | Miyashi | 379/199 |
| 4,488,005 | 12/1984 | Frantz | 379/88 |
| 4,602,129 | 7/1986 | Matthews et al. | 379/88 |
| 4,696,028 | 9/1987 | Morganstein et al. | 379/213 X |

Primary Examiner—James L. Dwyer
Attorney, Agent, or Firm—Ross T. Watland

[57] ABSTRACT

A method of discouraging the completion of certain classes of calls including wrong-number calls. Incoming calls from calling parties not included on a customer-specified screening list are first connected to an appropriate advisory announcement. Such calls are advantageously not extended to the customer station if the calling party disconnects within a specified time of receiving the announcement. To limit the delay of calling parties, the announcement is bypassed for callers included on the screening list and may be quickly interrupted by the transmission of a single, dual tone multi-frequency digit from the calling station.

15 Claims, 3 Drawing Sheets

METHOD OF DISCOURAGING THE COMPLETION OF WRONG-NUMBER CALLS

TECHINAL FIELD

This invention relates to call processing features in communication systems and, more particularly, to the processing of wrong-number telephone calls.

BACKGROUND OF THE INVENTION

Telephone customers can be seriously inconvenienced by receiving many wrong-number calls if their assigned directory number is similar to a number that, for one reason or another, is frequently dialed incorrectly. For example, the customer number may differ from that of a popular business establishment or radio station by having one different digit or by being included in a different area code. Of course, the inconvenienced customer may request that a new number be assigned by the local telephone company. However, this option is often undesirable because of cost and inconvenience to both the customer and the telephone company. Moreover, the customer may desire to retain the number, for example in the case of a business that has maintained the same widely known and remembered directory number for a period of years.

In view of the foregoing, a recognized problem in the art is the inconvenience suffered by telephone customers that receive many wrong-number calls.

SUMMARY OF THE INVENTION

The aforementioned problem is solved and a technical advance is achieved in accordance with the principles of the invention in an illustrative method of discouraging the completion of certain classes of calls including wrong-number calls, by having incoming calls from calling parties not included on a customer-specified screening list first connected to an appropriate advisory announcement. Such calls are advantageously not extended to the customer station if the calling party disconnects within a specified time of receiving the announcement. To limit the delay of calling parties, the announcement is bypassed for callers included on the screening list and may be quickly interrupted by the transmission of a single, dual tone multifrequency digit from the calling station.

In accordance with the method of the invention, a screening list is examined in response to a receipt of a call from a calling directory number to a called directory number. The examined list defines the entitlement of calling directory numbers to completion of incoming calls to the called directory number. An examination of the list indicating an absence of entitlement to complete the call results in signaling to effect a disconnection of the call.

The call is terminated without effecting an alerting of the called station when a disconnect request is received from the calling station within a predetermined time of the signaling. Otherwise, the call is selectively completed to the called station after the predetermined time expires.

The signaling comprises an audible announcement transmitted to the caller. The announcement is bypassed when the examination of the list indicates an entitlement to complete the call. The announcement is interrupted in response to an announcement interrupt signal, e.g., a dual tone multifrequency digit, from the calling station. The announcement may comprise a recording of the voice of a customer expected to answer calls to the called directory number.

BRIEF DESCRIPTION OF THE DRAWING

A more complete understanding of the invention may be obtained from a consideration of the following description when read in conjunction with the drawing in which.

DETAILED DESCRIPTION

Figure 1:
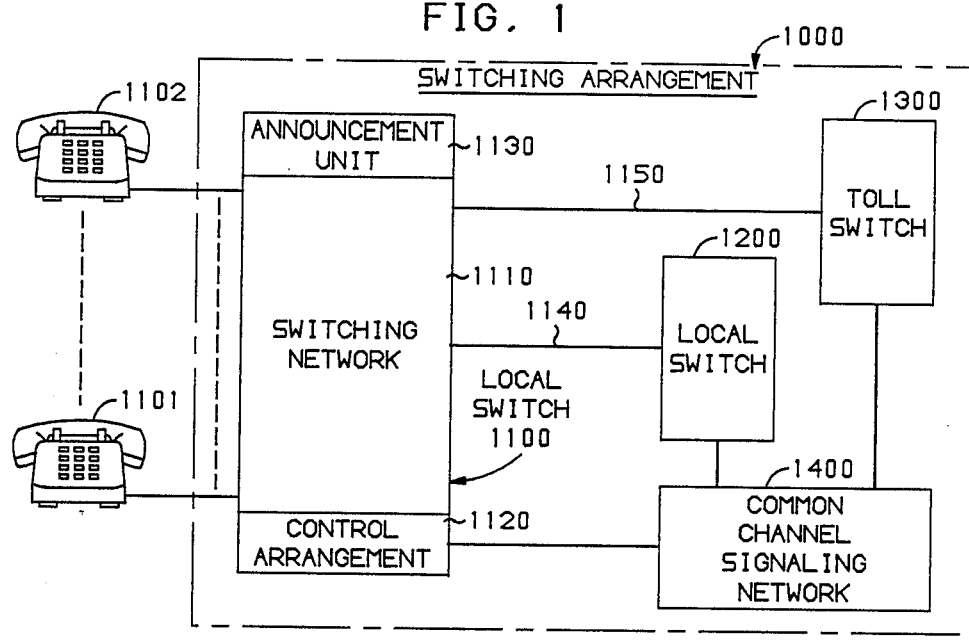
FIG. 1 is a diagram of an illustrative switching arrangement in which the exemplary feature of the present invention is implemented.

In FIG. 1, switching arrangement 1000 includes local switches 1100 and 1200, toll switch 1300 and common channel signaling network 1400. An example of local switch 1100 or 1200 is disclosed in U.S. Pat. No. 3,570,008 issued to R. W. Downing, et al., on Mar. 9, 1971, and in *The Bell System Technical Journal*, Vol. 43, No. 5, Parts 1 and 2 of September, 1964. An example of toll switch 1300 is disclosed in U.S. Pat. No. 3,736,381 issued to G. D. Johnson, et al., on May 29, 1973. Switches 1100, 1200, and 1300 are connected together and to other switches via a common channel signaling network 1400 such as that described in *The Bell System Technical Journal*, Vol. 57, No. 2 of February, 1978. Network 1400 provides high-speed data transmission between the control facilities of switches 1100, 1200 and 1300 to carry all signaling, address, and network control information independently of the interoffice talking paths. For instance, this information includes the identity of trunks used by customers as well as calling and called party identification.

Figure 2:
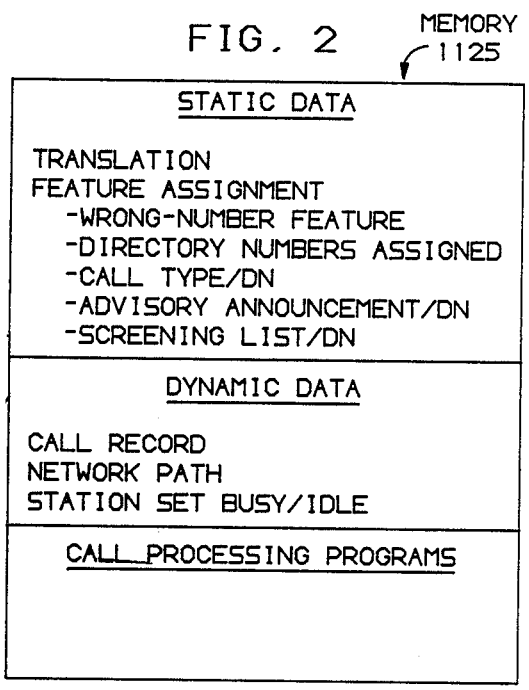
FIG. 2 is memory map for memory facilities included in a control portion of the switching arrangement of FIG. 1.

Local switch 1100 includes a switching network 1110 interconnecting a plurality of analog station sets such as 1101 and 1102 under the control of a control arrangement 1120. Also specifically shown is announcement unit 1130 which is used in accordance with the present invention to play advisory announcements either to calling parties at analog station sets 1101 and 1102 served by local switch 1100 or to calling parties connected via local switch 1200 or toll switch 1300. Control arrangement 1120 includes a memory 1125 (FIG. 2) which includes storage for static and dynamic data as well as the call processing programs used to control the operation of switch 1100. Included in the static data section of memory 1125 is the feature assignment data which includes a list of directory numbers that are assigned the wrong-number feature of the present invention. For each directory number that is assigned the wrong-number feature, the feature assignment data includes the particular troublesome call type, an identification of an advisory announcement to be played, and a screening list of numbers from which calls are to be immediately connected to the called station set without playing the advisory announcement.

Examples of troublesome call types include intra-switch calls, and inter-switch local or toll calls coming in on trunks 1140 or 1150 from local switch 1200 or toll switch 1300. For example, assume that the directory number assigned to station set 1101 is 555-2336 and the directory number assigned to station set 1102 is 555-2363. Further assume that the directory number 555-2363 is heavily advertised by the media and is called hundreds of times each day. The misdialing of even a small percentage of those calls as 555-2336 would result in the completion of many wrong-number intra-switch calls to the customer at station set 1101. As a second example of a troublesome intra-switch call, assume that the toll-free number 1-800-555-2336 is widely publicized and a small percentage of callers forget to dial the 1-800 prefix. Again the customer at station set 1101 can be seriously inconvenienced by receiving frequent wrong-number calls. As an example of a troublesome inter-switch call, assume that the customer at station set 1101 lives within area code (312), but that the long distance number (212) 555-2336 is publicized nationally by either broadcast or print media. A single digit misdialing of the area code as (312) rather than (212) will result in the completion of a wrong-number call to station set 1101. Although such calls could be either intra-switch or inter-switch, in many circumstances the percentage of inter-switch calls would be sufficiently high that the intra-switch calls could be ignored as only a minor inconvenience.

Telephone customers who receive a high number of wrong-number calls are provided with a feature in accordance with the present invention to discourage the completion of such calls. The customer may specify that only a certain call type, e.g., intra-switch or inter-switch, be processed in accordance with the feature as can be determined from the particular calling errors that result in the completion of wrong-number calls to that customer. A particular announcement can be provided for all incoming calls of the specified type to the customer's number. The advisory announcement would be appropriate for the particular circumstances as, for example: "This is not 1-800-555-2336, if you intended to call the John Doe residence, please stay on the line."; or "To have your call completed to the John Doe residence, please remain on the line for five seconds." To prevent callers from disconnecting immediately when they hear that they have been connected to an announcement, the announcement could be recorded in the customer's own voice as, for example, "This is John Doe. Please hold the line for at least five seconds to allow your call to be completed." The individual announcements are stored by announcement unit 1130, and are accessed by reference to the customer's directory number.

In order to limit the unnecessary delay of correctly dialed incoming calls, the customer may specify a screening list of directory numbers of friends and associates who will have their calls completed normally without the advisory announcement. The screening list may be provided when the feature is initially assigned and then supplemented from the customer's station set as described further herein. The calling number is either determined from the translation data stored in memory 1125 for an intra-switch call, or is provided via common channel signaling network 1400 for an inter-switch call.

Once switching network 1110 has connected the calling party to announcement unit 1130 for the advisory announcement, control arrangement 1120 responds to the receipt of an announcement interrupt signal comprising a single, dual tone multifrequency (DTMF) digit from the calling party, by disconnecting announcement unit 1130 and completing the call as dialed. Thus calling parties that have not been included on the screening list can avoid listening to the entire announcement by dialing a single DTMF digit when the announcement begins.

Figure 3:
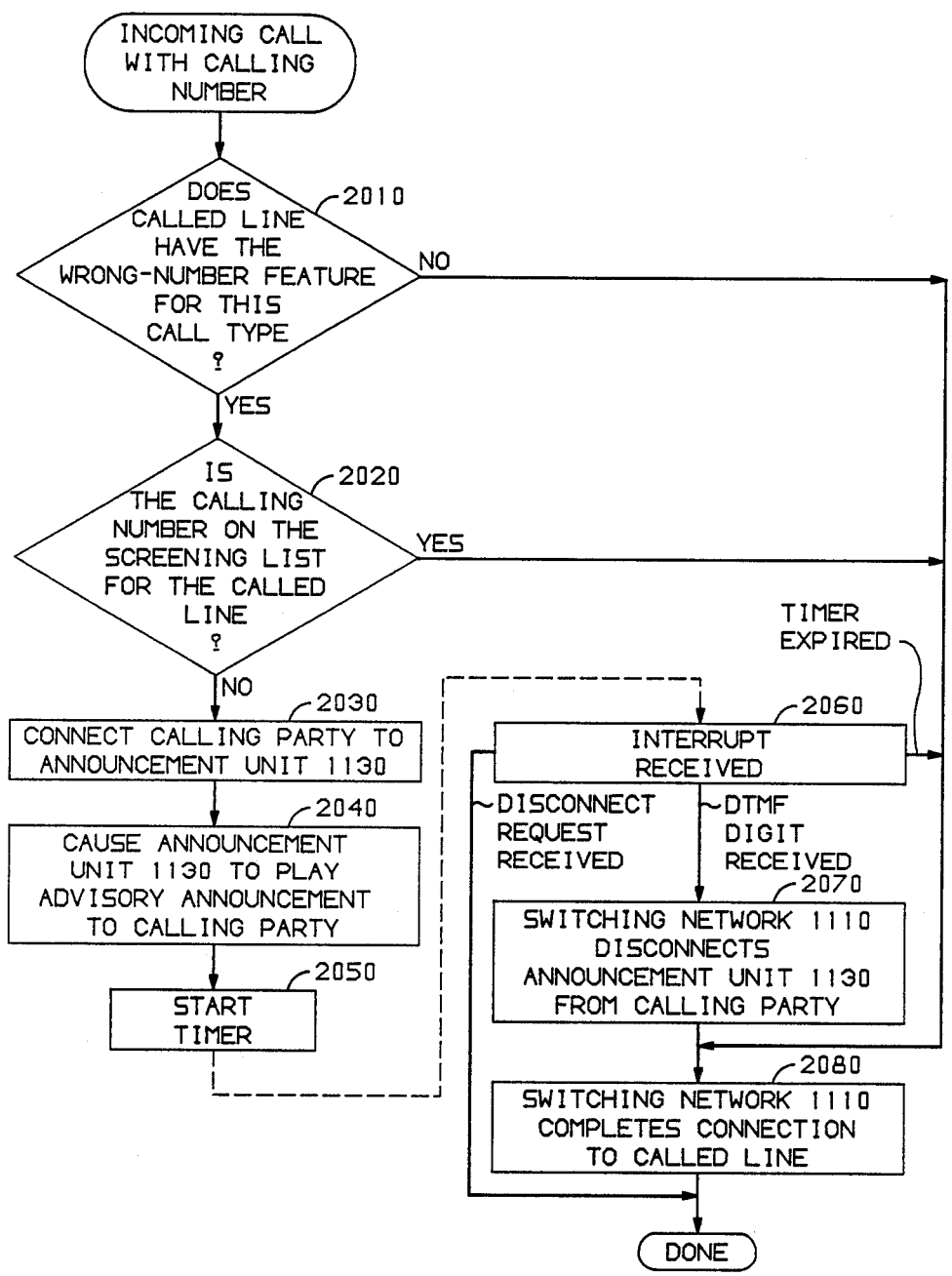
FIGS. 3 and 4 are flow charts of programs used to implement the exemplary feature of the invention.

The flow chart of the call processing program used by control arrangement 1120 to implement the wrong-number feature is shown in FIG. 3. The program begins with an incoming call including the calling number (obtained either from the translation data in memory 1125 for an intra-switch call or from common channel signaling network 1400 for an inter-switch call). Execution proceeds to decision block 2010 where memory 1125 is read to determine whether the called line has the wrong-number feature for the call type of this incoming call. If an affirmative determination is made in block 2010, execution proceeds to decision block 2020 where memory 1125 is again read to determine whether the calling number is on the screening list associated with the called number. If not, execution continues with block 2030 and control arrangement 1120 effects a connection by switching network 1110 of the calling line or trunk to announcement unit 1130. Execution proceeds to block 2040 where control arrangement 1120 causes announcement unit 1130 to play the advisory announcement specified for the called number. Then in block 2050 a timer is started. Execution resumes in block 2060 when an interrupt is received. If the interrupt is generated in response to the detection of a DTMF digit on the calling line or trunk, execution proceeds to block 2070 and switching network 1110 disconnects announcement unit 1130 from the calling line or trunk. Then during block 2080, switching network 1110 completes the connection to the called number. If the interrupt is generated in response to the expiration of the timer after a predetermined time period, e.g., 5 or 10 seconds, execution proceeds directly from block 2060 to block 2080 and switching network 1110 completes the connection to the called party. (Although not shown in FIG. 3, switching network 1110 disconnects announcement unit 1130 from the calling party when the announcement is completed.) However, if the interrupt received in block 2060 is generated in response to a disconnect request from the calling party (as is anticipated if the calling party listens to the announcement and hangs up after realizing that a dialing error has been made), the call is not completed to the called party.

Figure 4:
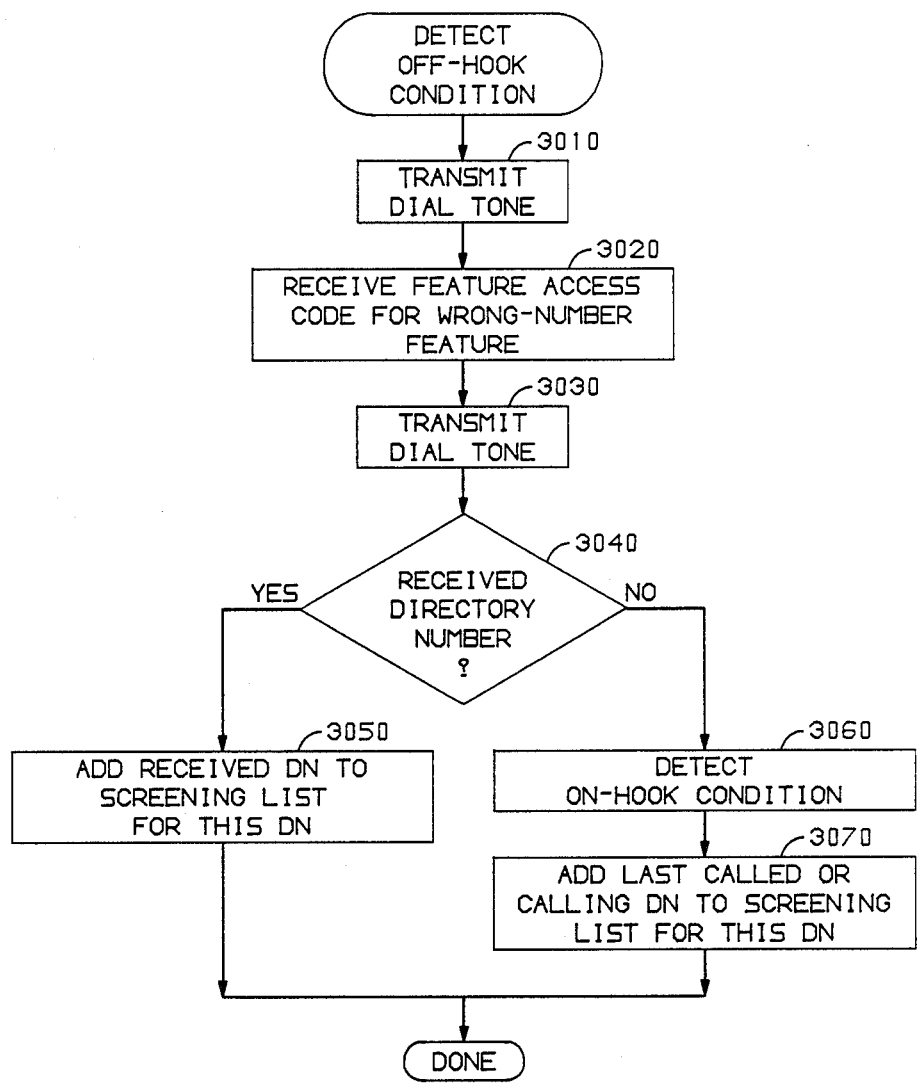

The flow chart of the program used by control arrangement 1120 to allow numbers to be added to a customer's screening list is shown in FIG. 4. Assume that the customer at station set 1101 has the wrong-number feature and wishes to add the directory number of a close friend to this screening list. The customer at station set 1101 first goes off-hook. The off-hook condition is detected at local switch 1100 and program execution begins with block 3010 during which local switch 1100 transmits dial tone to station set 1101. The customer at station set 1101 then dials a feature access code, e.g., *2, associated with the wrong-number feature. The feature access code is received by local switch 1100 during block 3020, execution proceeds to block 3030 where dial tone is again transmitted to station set 1101. The customer at station set 1101 next dials the directory number to be added to the screening list. Execution continues with decision block 3040 during which a determination is made of whether a directory number has been received. If a directory number has been received, execution proceeds to block 3050 and the received directory number is added to the screening list associated with the directory number of station set 1101. Another optional method of adding a number to the screening list is represented in the flow chart of FIG. 4 by blocks 3060 and 3070. Assume that the customer has just completed a conversation with a party and realizes that the directory number of that party should be added to the screening list. Rather than dialing the directory number, the customer at station set 1101 can simply dial the feature access code and then go on-hook. Accordingly, no directory number is received and execution proceeds from block 3040 to block 3060 where the on-hook condition is detected. Then during block 3070 the last called or calling directory number is added to the screening list.

It is to be understood that the above-described call processing method is merely illustrative of the principles of the present invention and that many variations may be devised by those skilled in the art without departing from the spirit and scope of the invention. Although the illustrative switching arrangement of FIG. 1 included analog station sets and local switches, the method also applies to arrangements comprising integrated services digital network (ISDN) switching arrangements such as the switching system disclosed in U.S. Pat. No. 4,592,048 issued to M. W. Beckner et al., on May 27, 1986.

What is claimed is:

1. A method of discouraging the completion of wrong-number calls, said method comprising the steps of:
   receiving a call request defining a call from a calling station to a called directory number,
   determining the calling directory number of said calling station,
   examining a screening list of directory numbers, and
   when said examining indicates an absence of said calling directory number on said screening list, ascertaining whether said call is a wrong-number call, wherein said ascertaining comprises transmitting a message to said calling station to provide a caller with information enabling a determination by said caller of whether said call is a wrong-number call.

2. A method in accordance with claim 1 further comprising
   selectively completing said call to a called station associated with said called direictory number after an expiration of a predetermined time after said message is transmitted.

3. A method in accordance with claim 1 further comprising
   terminating said call without effecting an alerting of a called station associated with said called directory number in response to a receipt, after said message is transmitted and before an expiration of a predetermined time after said message is transmitted, of a disconnect request from said calling station.

4. A method in accordance with claim 1 further comprising
   selectively completing said call to a called station associated with said called directory number in response to an expiration of a predetermined time after said message is transmitted, and in response to a receipt of an interrupt signal from said calling station.

5. A method in accordance with claim 1 further comprising
   bypassing said ascertaining when said examining indicates a presence of said calling directory number on said screening list.

6. A method in accordance with claim 1 further comprising
   interrupting said message transmitting in response to a signal from said calling station.

7. A method of discouraging the completion of wrong-number calls to a plurality of directory numbers, for use in a switching arrangement interconnecting a plurality of stations and including memory means for storing a screening list of directory numbers for each of said plurality of directory numbers, said method comprising the steps of:
   receiving a call request defining a call to a called one of said plurality of directory numbers from a calling one of said stations associated with a calling directory number,
   examining the screening list for said called directory number to determine whether said calling directory number is included thereon,
   when said examining indicates an absence of said calling directory number on said screening list for said called directory number, ascertaining whether said call is a wrong-number call, wherein said ascertaining comprises transmitting a message to said calling station to provide a caller with information enabling a determination by said caller of whether said call is a wrong-number call, and
   selectively completing said call to a called station associated with said called directory number after an expiration of a predetermined time after said message is transmitted.

8. A method in accordance with claim 7 wherein said selectively completing comprises
   terminating said call, without effecting an alerting of said called station and without completing said call, in response to a receipt, after said message is transmitted and before said expiration of said predetermined time, of a disconnect request from said calling station.

9. A method in accordance with claim 7 further comprising
   after completing said call to said called station, adding said calling directory number to said screening list for said called directory number in response to only a feature access code and a return to on-hook from said called station.

10. A method in accordance with claim 7 wherein said message comprises an audible annoucement comprising a recording of the voice of a customer expected to answer calls to said called directory number.

11. A method in accordance with claim 7 further comprising
    before said examining, determining a call type for said call, and
    performing said examining, ascertaining, and selectively completing only when said determined call type is a predefined call type.

12. A method in accordance with claim 11 wherein said predefined call type is intra-switch.

13. A method in accordance with claim 11 wherein said predefined call type is inter-switch.

14. A method of discouraging the completion of wrong-number calls, said method comprising the steps of:
    receiving a call request defining a call from a calling station to a called directory number,
    in response to said call request, determining whether a wrong-number feature is assigned to said called directory number, in response to a determination that said wrong-number feature is assigned to said called directory number, ascertaining whether said call is a wrong-number call, wherein said ascertaining comprises transmitting an audible announcement to said calling station to provide a caller with information enabling a determination by said caller of whether said call is a wrong-number call and defining a signal for use to indicate that said caller still requests completion of said call, and in response to a receipt of said defined signal from said calling station, selectively completing said call to a called station associated with said called directory number.

15. A method in accordance with claim 14 wherein said defined signal comprises a continued off-hook signal from said calling station.

* * * * *